Patented Apr. 2, 1946

2,397,886

UNITED STATES PATENT OFFICE 2,397,886

CEMENT COMPOSITION AND METHOD OF MAKING SAME

Edward W. Scripture, Jr., Shaker Heights, Ohio

No Drawing. Application July 17, 1942,
Serial No. 451,322

12 Claims. (Cl. 106—90)

This invention relates to a cement composition, a composition for grinding cement, and particularly to a method of grinding cement wherein the rate of grinding may be increased with existing equipment.

Hydraulic cements are manufactured by mixing together in a finely divided state, in suitable proportions, either by a wet process or a dry process, suitable raw materials, usually of a calcareous and a siliceous nature, to produce after the manufacturing operation chemical compounds having hydraulic and cementitious properties in the desired proportions. The mixed raw materials are heated together in a kiln, in modern practice usually a rotary kiln, and burned at a temperature which causes sintering, or in some cases they may be burned to actual fusion. After burning the resultant product, usually called "clinker," is allowed to cool. In this state of manufacture the cementitious compounds have been formed but exist in a physical state, that of relatively large pieces with very low surface area, in which they cannot be used to make mortar or concrete mixes. This cement clinker is then reduced by grinding, usually in a ball mill of either the intermittent or continuous type, to a relatively fine state of subdivision having a relatively large surface area. During this stage, calcium sulfate in one form or another is usually added to the cement to prevent too rapid set.

The hydraulic properties of the cement depend on its chemical composition and on the burning operation, but also to a considerable extent on the grinding and the degree of fineness to which it has been reduced. For example, the plastic properties and the rate at which the cement hydrates are markedly affected by the surface area, i. e., the degree of grinding.

The grinding of cement clinker requires the use of considerable equipment and consumes a substantial period of time. In order to operate the equipment, power in one form or another is required. The grinding operation, therefore, adds substantially to the cost of manufacture of cement and it will be obvious that the finer the grinding the greater will be this cost.

It has heretofore been known that certain materials when added to cement clinker in the mill will facilitate grinding and will increase the efficiency of this operation. In order to be useful, such materials must not have an adverse effect on the plastic or hydraulic properties of the cement, as by retarding or preventing hydration. It is preferable that such materials, which may be termed "grinding aids," shall improve the properties of the cement and of the mortar or concrete in which they are used with respect to strength, rate of hardening, plasticity, durability, or other properties.

It is an object of this invention to provide a method of producing finely ground cement, wherein the cost of grinding the cement clinker is reduced.

It is another object of this invention to provide a method for grinding cements, wherein the time required to reduce cement clinker to a given surface area is reduced.

It is another object of this invention to provide a method wherein the finer grinding of cement clinker and the production of a cement of greater surface area are facilitated.

It is another object of this invention to provide a ground cement clinker which shall have improved plastic and hydraulic properties.

It is a further object of the present invention to provide an indurating composition for cement.

It is a still further object of the present invention to provide an indurating composition which will improve the properties of concrete, mortar and the like made from hydraulic cement mixes containing pozzolanic materials, accelerating agents, dispersing agents, etc., in suitable amounts.

Some grinding aids heretofore proposed are hygroscopic and when incorporated in the cement in amounts proposed adversely affect the keeping or storing properties of the cement by absorbing moisture from the atmosphere. It is, therefore, another object of the present invention to provide a method for grinding cement wherein the cost of grinding is reduced and whereby the storing or keeping qualities of the cement produced are not impaired.

In my prior application Serial No. 406,904, filed August 14, 1941, now Patent No. 2,360,517, granted October 17, 1944, and Patent No. 2,264,336, issued December 2, 1941, I disclosed that certain aromatic compounds, including the substituted benzoic acids, improve a concrete or cement mix when incorporated therein, and when incorporated with cement clinker reduce the grinding time and power required to obtain a cement with a given surface area.

It has now been found that the above objects are also accomplished by incorporating the cement and preferably by incorporating in the cement clinker in the grinding mill a relatively small percentage, based on the weight of the cement, of a saturated aliphatic compound consisting of a carbon-to-carbon chain having at least four carbon atoms, preferably less than twelve, and containing attached to the carbon atoms besides hydrogen at least two hydroxyl groups and at least one additional member of the group consisting of sulfate, sulfonic acid, sulfonate, halogen, nitro, nitroso and hydroxyl groups. The chain of carbon atoms may be straight or branched, as desired.

The compounds which I have found to be particularly effective in accomplishing the above objects have the general formula

where R is a substituted alkylene group (alkylene group having one or more hydrogens substituted by a member of the group consisting of sulfate, sulfonic acid, sulfonate, halogen, nitro, nitroso and hydroxyl groups) having at least four carbon atoms in a straight or branched chain. Substituted alkylene groups have the general formula $-C_mH_{(2m-k)}X_k-$, where $k$ and $m$ are integers of one to six and X is selected from sulfate, sulfonic acid, sulfonate, halogen, nitro, nitroso and hydroxyl groups. Examples of such groups are:

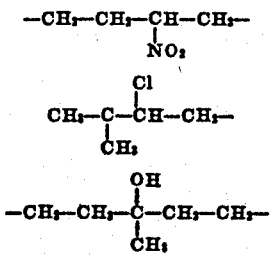

etc.

The following compounds are examples of those included by the above general formula and found to be effective in accomplishing the objects of the present invention:

2 nitro 2 methyl 1,3 propanediol;
2 nitro 2 ethyl 1,3 propanediol; and
Tris (hydroxymethyl) nitromethane.

Hydroxyl groups may be present on terminal carbon atoms, but it is preferred, especially when only two hydroxyl groups are present, that at least one hydroxyl group be connected to a carbon atom intermediate the ends of the chain. At least one solubilizing substituent should preferably be present for each five or six carbon atoms, and carbon atoms containing hydroxyl groups are preferably separated by at least one carbon atom.

The hygroscopic properties of the compound depend largely upon the length of the carbon-to-carbon chain, decreasing when the number of carbons is increased. A branched chain compound appears to be less hygroscopic than a straight chain compound of the same length; a branched chain compound also appears to be more soluble than a straight chain compound. Hence, compounds included by the above general formula wherein the alkylene group is a branched chain of four or more carbon atoms are usually preferred. At least four carbon atoms are desirable to reduce the hygroscopic properties of the compound to an extent such that most effective proportions may be incorporated in cement without adversely affecting its keeping qualities.

It has been observed that in the grinding of cement clinker the balls, in a ball mill, and the walls of the mill tend to become coated with the more or less finely ground cement. This formation on the grinding surfaces apparently exerts a cushioning effect, such that the rate of grinding is thereby greatly diminished.

Although I do not offer this explanation as a necessary explanation of the results of the present invention, I have found that when small amounts of these chemical compounds are added to cement clinker in a ball mill, the formation of a cushion on the grinding surfaces appears to be reduced and the efficiency of the grinding operation is increased. In this manner, the time required, and consequently the power input, to grind to a particular degree of fineness or surface area is reduced, or for a given time and power input the degree of fineness or surface area is increased.

It may be that the reason these compounds having plural solubilizing groups offer advantages over compounds having a single solubilizing group is that these lyophilic groups are adsorbed on the surfaces of the cement particles. By the adsorption of several groups placed at different points in the molecule, the molecule itself would be expected to assume a more or less horizontal position with relation to the cement particles, rather than a more or less vertical position, as might be expected if only a single group were adsorbed. For the same reason, it is desirable that the carbon atoms containing hydroxyl groups be spaced or separated in the chain by at least one carbon atom. In order to prevent folding or buckling of the compound between the hydroxyl groups, it is also preferable that no more than one group be attached to terminal carbon atoms. In this manner a given amount of the reagent would cover a larger surface area of a cement particle, or a smaller amount would be required to produce a given effect.

The saving in grinding time depends to a large extent both on the quantity of the above described compounds, which are present in cement, and on the degree of fineness desired in the cement. With an increase in quantity of the above described compound or compounds added to the mill from effective amounts, such as .005%, based on the weight of the cement, up to about .05% to .1%, an increase in the efficiency in grinding time may be had. Although as much as .3% to .5% of the above compounds may be incorporated with the cement clinker, appreciable further improvement in results is not obtained. It is generally preferable to use less than .05%, such as .045%, of the addition as most of the benefits are obtained with a saving in cost. When the cement is ground to a greater surface area, the saving in the grinding time over processes of the prior art is substantially increased.

The following examples illustrate the effect of the compounds of the above general formula in reducing the grinding time or in increasing the surface area of the cement:

*Example 1*

Two separate batches of the same amount of identical cement clinker were separately ground for two hours in the same cement mill. One batch served as a control and contained no organic addition. The surface areas of the cements produced and the additions are indicated in the following table:

| Batch No. | Addition | Surface area |
|---|---|---|
|  |  | Sq. cm./gr. |
| 1 | None | 1550 |
| 2 | 0.045% 2 nitro 2 methyl 1, 3 propanediol | 1855 |

*Example 2*

A weighed amount of cement clinker was incorporated in a mill. .045% of 2 nitro 2 ethyl 1,3 propanediol was added to the clinker and the mixture ground for two hours. Another batch of the same cement clinker was ground for two hours in the same mill without any addition. The surface area of the cement ground with the addition was 1810 sq. cm./gr. and the surface area of the cement ground without the addition was 1515 sq. cm./gr.

Other aliphatic compounds included in the above general formula may be substituted for the compounds in the above examples to obtain similar improvements.

In accordance with another aspect of the present invention, it has been found that compounds of the above general formula when present in relatively small proportions, as set forth above, also exert a beneficial effect upon a hardened cement or concrete mix when incorporated in the cement composition.

It is preferred to incorporate the compounds included by the above designated general formula into the cement during the grinding operation. It has been found that when they are thus incorporated, greater improvement in the cement may be obtained. However, a substantial improvement in the cement or concrete mix may be had when the above compounds are added to the ground cement at later stages.

Cement dispersing agents, such as active ingredients of waste sulphite liquor, naphthalene sulfonic acids, wetting agents, such as lauryl sodium sulfate and other alkali metal sulfates or sulfonates, and accelerators, such as calcium chloride and other metal chlorides or electrolytes, for increasing the rate of hardening or setting of the cement, pozzolanic materials, etc., may of course also be incorporated in the cement mix, if desired. One or more of the above organic compounds may also be mixed with suitable amounts of an accelerator, such as calcium chloride, and/or cement dispersing and/or wetting agents. While calcium chloride or other hygroscopic compounds may be added to the cement at the time of use, it is not usually desirable to add such hygroscopic substances to the clinker before or during grinding, as the keeping qualities of the cement produced would be reduced. A particularly desirable mixture for addition to cement may contain the solid constituents of waste sulphite liquor or other cement dispersing agent and calcium chloride with the ingredients proportioned to give in a cement mix .005% to .1%, based on the weight of the cement, of the aliphatic compound, .001% to .5% of a cement dispersing agent such as waste sulphite liquor residue, and the usual amounts, such as up to 2%, of calcium chloride. If desired, the solid constituents of waste sulphite liquor may be substituted by other cement dispersing agents, or even wetting agents.

Waste sulphite liquor or the dried residue thereof contains water-soluble, active ingredients which function to disperse cement particles in water. While the whole waste sulphite liquor, or the dried residue thereof, which is more conveniently handled, may be used, the cement dispersing components of the liquor or residue may be substituted, if desired. In referring to the solid constituents of waste sulphite liquor this expression is used to designate one or more of the active ingredients thereof, either dry or in water.

It will be apparent that the compounds which facilitate grinding may be added to the cement clinker in their natural physical forms or in solution, or in any other physical form. It will also be apparent that more or less of the usual amount of gypsum or other form of calcium sulfate may be added, depending on the desired characteristics of the cement, and that other substances may be added to the cement at the same time, or subsequently.

This application is directed to additional species of compounds coming within generic claims of my copending application, Serial No. 451,321, filed concurrently herewith and on which application Patent 2,364,555 was granted December 5, 1944.

Furthermore, it is to be understood that the particular form of product shown and described and the particular procedure set forth are presented for purposes of explanation and illustration, and that various modifications of said product and procedure can be made without departing from my invention as defined in the appended claims.

What I claim is:

1. In a process of grinding cement clinker, the step which comprises grinding the clinker in the presence of a small amount of a saturated aliphatic compound, consisting of a carbon-to-carbon chain having at least four and not more than 12 carbon atoms attached carbon to carbon, and consisting of carbon, hydrogen, at least two hydroxyl groups and one additional member of the group consisting of sulfate, sulfonic acid, sulfonate, halogen, nitro, nitroso and hydroxyl groups.

2. The process according to claim 1 wherein the aliphatic compound has at least one hydroxyl group attached to an intermediate carbon atom.

3. In a process of grinding cement clinker, the step which comprises grinding the clinker in the presence of a small amount of from about .005% to about .1%, based on the weight of the cement, of an aliphatic compound of the general formula

where R is a substituted alkylene group of four to twelve carbon atoms and consists of carbon, hydrogen and one member of the group consisting of sulfate, sulfonic acid, sulfonate, halogen, nitro, nitroso and hydroxyl groups.

4. In a process of grinding cement clinker, the step which comprises grinding the clinker in the presence of a small amount of from about .005% to about .1%, based on the weight of the cement, of an aliphatic compound of the general formula

where R is a branched chain alkylene group of four to twelve carbon atoms and consists of carbon and hydrogen and one member of the group consisting of sulfate, sulfonic acid, sulfonate, halogen, nitro, nitroso and hydroxyl groups.

5. The process according to claim 3 wherein the aliphatic compound contains three hydroxyl groups.

6. The process according to claim 3 wherein the aliphatic compound is 2 nitro 2 methyl 1,3 propanediol.

7. A dry cement containing a small amount of an aliphatic compound consisting of a carbon-to-carbon chain having at least four and not more than 12 carbon atoms, containing only besides hydrogen substituent groups consisting of at least two hydroxyl groups and one member of the group consisting of sulfate, sulfonic acid, sulfonate, halogen, nitro, nitroso and hydroxyl groups.

8. A dry cement containing from about .005% to about .1%, based on the weight of the cement, of an aliphatic compound of the general formula

where R is a substituted alkylene group of four to twelve carbon atoms and consists of carbon, hydrogen and one member of the group consisting of sulfate, sulfonic acid, sulfonate, halogen, nitro, nitroso and hydroxyl groups.

9. The cement according to claim 8 wherein the aliphatic compound contains three hydroxyl groups.

10. The cement according to claim 8 wherein the aliphatic compound contains a nitro group.

11. An indurating composition for addition to cement comprising the solid constituents of waste sulphite liquor and an aliphatic compound of the general formula

where R is a substituted alkylene group of four to twelve carbon atoms and consists of carbon, hydrogen and one member of the group consisting of sulfate, sulfonic acid, sulfonate, halogen, nitro, nitroso and hydroxyl groups, the ingredients being proportioned to give in a cement mix .005% to .1%, based on the weight of the cement, of the aliphatic compound, and .001% to .5% of the solid constituents of waste sulphite liquor.

12. A concrete or mortar mix comprising sand, aggregate, cement and a small amount of an aliphatic compound of the general formula

where R is a substituted alkylene group of four to twelve carbon atoms and consists of carbon, hydrogen and one member of the group consisting of sulfate, sulfonic acid, sulfonate, halogen, nitro, nitroso and hydroxyl groups.

EDWARD W. SCRIPTURE, Jr.